July 19, 1960  N. I. BELL  2,945,260
MOLD ASSEMBLIES

Filed June 19, 1957  2 Sheets-Sheet 1

Inventor
Neville I. Bell
By his Attorney

July 19, 1960 — N. I. BELL — 2,945,260
MOLD ASSEMBLIES
Filed June 19, 1957 — 2 Sheets-Sheet 2
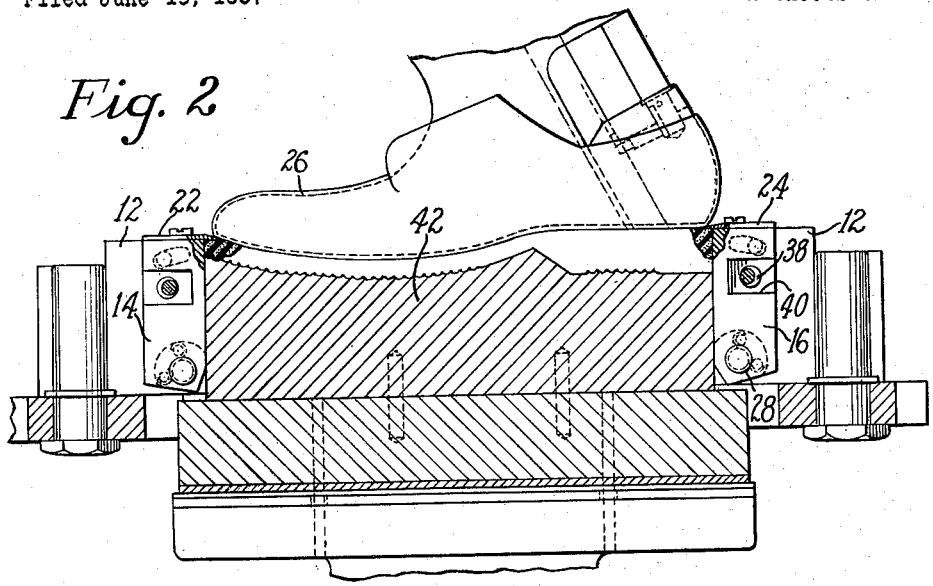
Fig. 2
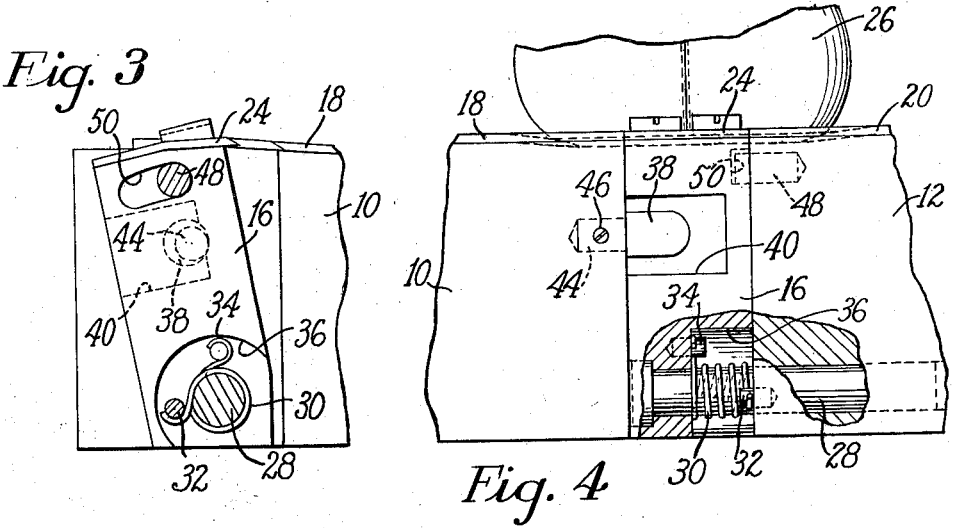
Fig. 3
Fig. 4
Inventor
Neville I. Bell
By his Attorney United States Patent Office 2,945,260
Patented July 19, 1960

2,945,260

MOLD ASSEMBLIES

Neville Ivan Bell, Leicester, England, assignor to United Shoe Machinery Corporation, Flemington, N.J., a corporation of New Jersey Filed June 19, 1957, Ser. No. 666,653

Claims priority, application Great Britain July 13, 1956

3 Claims. (Cl. 18—42)

This invention relates to mold assemblies and is herein illustrated in its application to assemblies of mold elements for molding or vulcanizing soles onto shoe bottoms.

In the molding or vulcanizing of soles onto shoe bottoms it is usual to provide an assembly of mold elements comprising a sole shaped bottom member and two side members which cooperate to provide a sole shaped mold cavity. For the manufacture of most types of shoes such an assembly is satisfactory but in the manufacture of certain types of shoes, particularly shoes having relatively blunt or square end portions, it has been found desirable to provide toe and heel mold members to form the end walls of the mold cavity and it is an object of the present invention to provide a mold assembly of this type which is both economical to manufacture and efficient in operation.

With the above object in view the present invention contemplates the provision of a shoe sole molding assembly having two side mold members, of a toe mold member mounted on a fulcrum element carried by one of the side mold members for swinging movement between a molding position and a retracted position. The other side mold member is provided with an adjustable cam member arranged to engage a cam surface formed in the toe mold member during relative movement of the side mold members toward each other in a direction parallel to the axis of swinging movement of the toe mold member thereby to effect the advancement of the toe mold member from its retracted position to its molding position. Suitable means is provided for biasing the toe mold member to its retracted position. In accordance with a further feature of the invention the cam member is mounted for adjustment on an eccentric axis in order to vary the molding position of the toe mold member.

The invention will now be described with reference to the accompanying drawings and pointed out in the appended claims.

In the drawings:

Fig. 2 is a side elevation of the mold assembly, partly in section, on a plane common to the longitudinal median line of a shoe in the mold assembly;

Fig. 3 is an enlarged view in side elevation illustrating the heel end of the mold assembly in its open position; and Fig. 4 is an enlarged end elevation showing the heel end portion of the mold assembly in its closed position.

Figure 1:
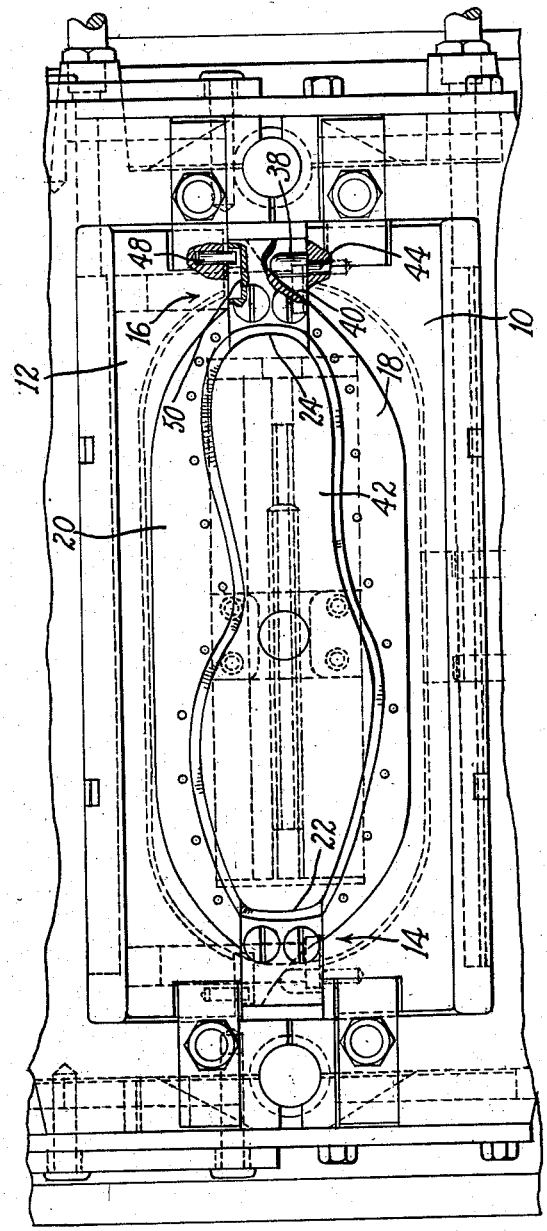
Fig. 1 is a plan view illustrating a mold assembly embodying the present invention and incorporated in a sole vulcanizing machine.

The illustrated mold assembly comprises two side molds, a toe mold and a heel mold constructed and arranged to cooperate with a sole mold member to provide a mold cavity in which an outsole is vulcanized to the bottom of a shoe arranged with its bottom surface in contiguous relation to the mold elements as shown in Fig. 2.

Referring to Fig. 1, the mold assembly comprises a side mold member 10 constructed and arranged to operate at the outer side of the shoe, a side mold 12 which operates at the inner side of the shoe, a toe mold 14 and a heel mold 16. In their closed position the mold members define the peripheral contour and the profile contour to be incorporated in an outsole to be molded or vulcanized in the mold assembly. Attached to the upper surfaces of the side molds 10 and 12 respectively are crease plates 18 and 20, and attached to the toe mold and heel mold respectively are crease plates 22 and 24. With the molds in their closed position, as shown in Fig. 1, the edges of the crease plates form a continuous line defining the feather line of a shoe of a given size and style such, for example, as the shoe 26 illustrated in Fig. 2. The edges of the crease plates engage the shoe upper and press against it uniformly and with sufficient force to prevent any flash of sole material between the upper and the crease plates in the vulcanizing operation.

As shown in Fig. 1, the toe mold 14 and the heel mold 16 are positioned between parallel end walls of the side mold members 10 and 12 and said end walls are contiguous to the opposite side faces of the toe mold and the heel mold respectively when the mold assembly is in its closed position illustrated in Fig. 1. The means for mounting the toe mold member and the heel mold member are identical and it will be understood that the following description of the means for mounting of the heel mold member 16 applies equally well to the means for mounting the toe mold member 14. Referring to Fig. 4, a headed pin 28 mounted in the mold 12 at the heel end thereof provides a pivotal mounting for the heel mold member 16. When the mold assembly is in its open position the heel mold member 16 is inclined rearwardly, as shown in Fig. 3. During the closing of the molds, mechanism hereinafter described swings the heel mold member 16 into its vertical or closed position, illustrated in Fig. 2. It will be understood that when the mold members are in their closed position, illustrated in Figs. 1 and 2, the inner surfaces of the mold members are in alinement and provide a continuous wall of the mold cavity and, in like manner, the inner edges of the crease plates are in alinement as shown in Fig. 1, defining the feather line of the shoe 26. For retracting the heel mold member 16 into its position illustrated in Fig. 3, a torsion spring 30 surrounds the pin 28 and has one end arranged to bear against a pin 32 mounted in and projecting from the side mold member 12 and has the other end arranged to bear against a pin 34 projecting from the base of a recess 36 formed in the heel mold member 16. For causing the heel mold member 16 to close concomitantly with the closing movement of the side mold members 10 and 12 a cam member herein illustrated as a round headed pin 38 is mounted in the mold member 10 and arranged to bear against the arcuate base of a notch 40 formed in the heel mold member 16. During the closing movements of the side mold members 10 and 12 the rounded head of the pin 38 engages the arcuate base of the notch 40 and swings the heel mold member 16 in a clockwise direction, as seen in Fig. 3, into its vertical or closed position illustrated in Fig. 2. It will be understood that the operation of the pin 38 must bring the heel mold member 16 into its closed position concomitantly with the closing of the side mold members 10 and 12. In order to provide for such adjustment of the pin 38 as may be required to effect this result the pin, as herein illustrated, is provided with an eccentric stem 44, and a set screw 46 (Fig. 4) is provided for securing the pin in its adjusted position. Referring to Fig. 3, the retracted position of the heel mold member 16 is determined by the engagement of a pin 48 projecting from the side mold member 12 with the end wall of a groove 50 formed in the heel mold member 16.

Having thus described my invention, what I claim as new and desire to secure by Letters Patent of the United States is:

1. A shoe sole molding assembly comprising a sole mold member, a first side mold member, a second side mold member, a toe mold member formed with a cam surface, a fulcrum element mounted in the first side mold member and providing a support for the toe mold member on which said toe mold member swings about an axis between a molding position and a retracted position, means for biasing the toe mold member to its retracted position, and an adjustable cam member mounted in the second side mold member and arranged to engage said cam surface during relative movement of the side mold members toward each other in a direction parallel to said axis to effect the advancement of the toe mold member from its retracted position to its molding position.

2. A shoe sole molding assembly comprising a sole mold member, a first side mold member, a second side mold member, a toe mold member having an internal cam surface; a fulcrum element mounted in the first side mold member and attaching the toe mold member to the side mold member, said fulcrum element having an axis arranged to afford swinging movement of the toe mold member between a molding position and a retracted position, and a cam member mounted in the second side mold member and operable by relative movement of the side mold members toward each other and parallel to said axis to effect the advancement of the toe mold member from its retracted position to its molding position, said cam member being mounted for adjustment on an eccentric axis thereby to vary the molding position of the toe mold member.

3. A shoe sole molding assembly comprising a sole mold member, a first side mold member, a second side mold member, a pair of end mold members simultaneously operative with said side members to form a closed sole molding cavity, fulcrum elements mounted in the first side mold member and attaching the end mold members thereto for swinging movement relatively to the side mold member between a molding position and a retracted position, and a pair of round headed pins mounted in the second side mold member, each end mold member having a recess arranged to receive one of the pins and said recess having an arcuate wall against which the receivable pin is moved endwise by relative movement of the side mold members toward each other to effect the concomitant advancement of each of the toe mold members from its retracted position to its molding position.

References Cited in the file of this patent

UNITED STATES PATENTS

| | | |
|---|---|---|
| 900,276 | Geffers | Oct. 6, 1908 |
| 1,475,032 | Shrum et al. | Nov. 20, 1923 |
| 1,995,429 | Laura | Mar. 26, 1935 |
| 2,541,544 | Rahaim | Feb. 13, 1951 |
| 2,790,996 | Zelik et al. | May 7, 1957 |

FOREIGN PATENTS

| | | |
|---|---|---|
| 1,031,629 | France | Mar. 25, 1953 |